US005400624A

United States Patent [19]

Shieh

[11] Patent Number: 5,400,624

[45] Date of Patent: Mar. 28, 1995

[54] U-SHAPED PADLOCK STRUCTURE

[76] Inventor: Jen-Guey Shieh, No.29, Lane 488, Sec. 2, Hsing Jen Rd., Chung-Li, Tuan Yang, Taiwan, Prov. of China

[21] Appl. No.: 106,620

[22] Filed: Aug. 16, 1993

[51] Int. Cl.[6] .................... C05B 67/22

[52] U.S. Cl. .................... 70/38 A; 70/39

[58] Field of Search .................... 70/39, 38 R, 38 A, 53, 70/52, 24–26, 52, 53

[56] References Cited

U.S. PATENT DOCUMENTS

| | | | |
|---|---|---|---|
| 4,584,855 | 4/1986 | Burlingame | 70/38 A |
| 4,949,564 | 8/1990 | Barzilai | 70/39 |
| 5,199,282 | 4/1993 | Wang | 70/38 A |
| 5,331,830 | 7/1994 | Su | 70/38 A |

FOREIGN PATENT DOCUMENTS

| | | | |
|---|---|---|---|
| 182417 | 10/1922 | United Kingdom | 70/39 |

*Primary Examiner*—Peter M. Cuomo
*Assistant Examiner*—Darnell M. Boucher
*Attorney, Agent, or Firm*—Bacon & Thomas

[57] ABSTRACT

The invention relates to a U-shaped padlock structure comprising a transverse locking mechanism provided inside the tubular lock body. The locking mechanism consists of a lock cylinder 31, a V-shaped cam 32, a front slide 33, a core rod 34, a resilient element 35, a locating element 36, a center element 37, a rear slide 38, and a short core pin 39 in sequence. The transverse locking mechanism is operated by turning the lock core of the lock cylinder 31 to rotate together with the V-shaped cam 32, which in turn urges the front slide 33, the core rod 34, and the rear slide 38 to move together in a transverse leftward or rightward direction, resulting in a locking or unlocking effect by way of the engagement or disengagement of the core pin with the locking holes formed on the U-shaped shackle. In addition, with the arrangements of an elliptical axle hole 333 of the front slide and a stepped column 345 having a larger diameter provided on the middle segment of the core rod, in cooperation with the axle hole 362 of the locating element 36, the invention can prevent the padlock from being destructed by giant impact or consecutive strikes, thus enhancing the security protection provided by the locking device.

3 Claims, 5 Drawing Sheets

U-SHAPED PADLOCK STRUCTURE

BACKGROUND OF THE INVENTION

The invention relates to a U-shaped padlock structure, especially to a structure that is easy to use and employs the rotation of a lock core of a lock cylinder to drive a V-shaped cam to transversely move core pins in a rightward or leftward direction, resulting in a locking or unlocking effect by way of the engagement or disengagement of the core pins with the locking holes of the U-shaped shackle.

The main application of the locking device of the invention is to lock wheel spokes of cars, motorcycles, or bicycles to prevent theft.

As can be seen from FIG. 1, a prior art padlock is used to have a U-shaped shackle 1′ with a L-shaped hook 11′ at one end and an engaging notch 12′ at the other end, a lock body 2′ with an opening 21′ at one end corresponding to the foregoing hook 11′ and with a lock cylinder 3′ at the other end, and a transversely movable core catch 22′ provided therein so that after the engaging notch 12′ of the shackle 1′ being inserted into the openings formed on the lock body, turning the lock cylinder 3′ to move transversely the core catch 22′ into the engaging notch 12′ will result in a locking effect.

There were the following deficiencies in the foregoing padlock.

1. A larger space requirement for the locking and the unlocking operations of the padlock: Such a requirement apparently conflicts with a real life in which the people who live in a crowded city often find it hard to find a parking space, thus resulting in much inconvenience for users.
2. Orientation requirements for matching a shackle to a lock body due to a difference in the constructions of two end portions: When the light is weak or when in haste the users often make a mistake in fitting the shackle in the lock body in a wrong direction. Consequently, a locking operation becomes a time-consuming thing, requiring much perseverance.
3. The requirement of turning the U-shaped shackle and the lock body to a certain angle for the engagement or disengagement between these two parts. This fact will lead to wear and deformation, resulting in a mismatching among the shackle, the lock body, and other relevant parts and a reduction in the service life of the padlock.

Another popular type of a U-shaped padlock on the market is shown in FIG. 2. The two ends of the U-shaped lock bar 10″ are individually provided with an open-ended groove 11″ with an orifice at the inner end of the groove. Inside the tubular body 20″ is equipped with a flat locking plate 30″ secured on a holder 21″ at two ends thereof. The rotation of the locking plate 30″ is activated by a lock core having a key 40″ attached thereon. When the locking plate 30″ is turned to a vertical position, the lock bar 10″ can easily fall into the locking holes 50″ of the holder 21″ while the locking plate enters into the grooves 11″ from the openings at the lower ends of the grooves. Again, returning the flat locking plate to the horizontal position can prevent the padlock from disengagement, as shown in FIG. 3.

Although the second type of prior art padlocks can perform the locking and unlocking functions too, it needs to grasp the tubular lock body 20″ by a hand while holding a key by the other hand whenever conducting a locking operation. Then insert the key into the lock core and turn the flat locking plate to a vertical position and hold it there. At that time, users must struggle to insert the U-shaped lock bar into the locking holes and keep it there while turning the key to lock the U-shaped lock bar. The procedure is rather difficult for one who only has two hands available and remains to be overcome.

SUMMARY OF THE INVENTION

In view of the shortcomings described above, the object of the invention is to provide a U-shaped padlock structure that makes use of the rotation of a lock core to drive a V-shaped cam, resulting in a transverse movement of the core pin in the leftward or rightward direction to enter or escape from the locking holes of the U-shaped shackle, thus obtaining a locking or unlocking effect.

To further explain the features of the invention, a description of the essence of the invention is presented as follows.

In the U-shaped padlock of the invention, a transverse locking mechanism, in sequence consisting of a lock cylinder, a V-shaped cam, a front slide, a core rod, a resilient element, a locating element, a center element, a rear slide and a short core pin, is located inside a tubular lock body. Such a construction is easy-to-assemble, without a need of a complicated assembling procedure. And so it is economical in production.

The padlock has a tough, endurable structure capable of bearing giant external forces without destruction. Besides, engaging components such as core pins, and locking holes can withstand wear without the deterioration of functions and so an extended service life is ensured.

When a locking operation is performed, the U-shaped shackle according to the invention can be directly inserted into the lock body without the need of turning both of them to a certain angle and thus a limitation of space is eliminated. Moreover, the insertion orientation of the U-shaped shackle can be interchangeable. As a result, the invention has the virtue of ease-to-use.

In particular, the axle hole of the front slide according to the invention is designed to be an elliptical one; a stepped column having a larger diameter is provided on the middle segment of the locating element where the stepped column works in cooperation with the axle hole of the locating element. With this anti-strike arrangement, the locking device can beat any attempts to unauthorizedly unlock it by a series of strikes or giant external forces. Therefore, the locking device of the invention can provide more security protection to users.

An embodiment of the invention will be described in greater detail with reference to the accompanying drawings.

DETAILED DESCRIPTION

Figure 1:
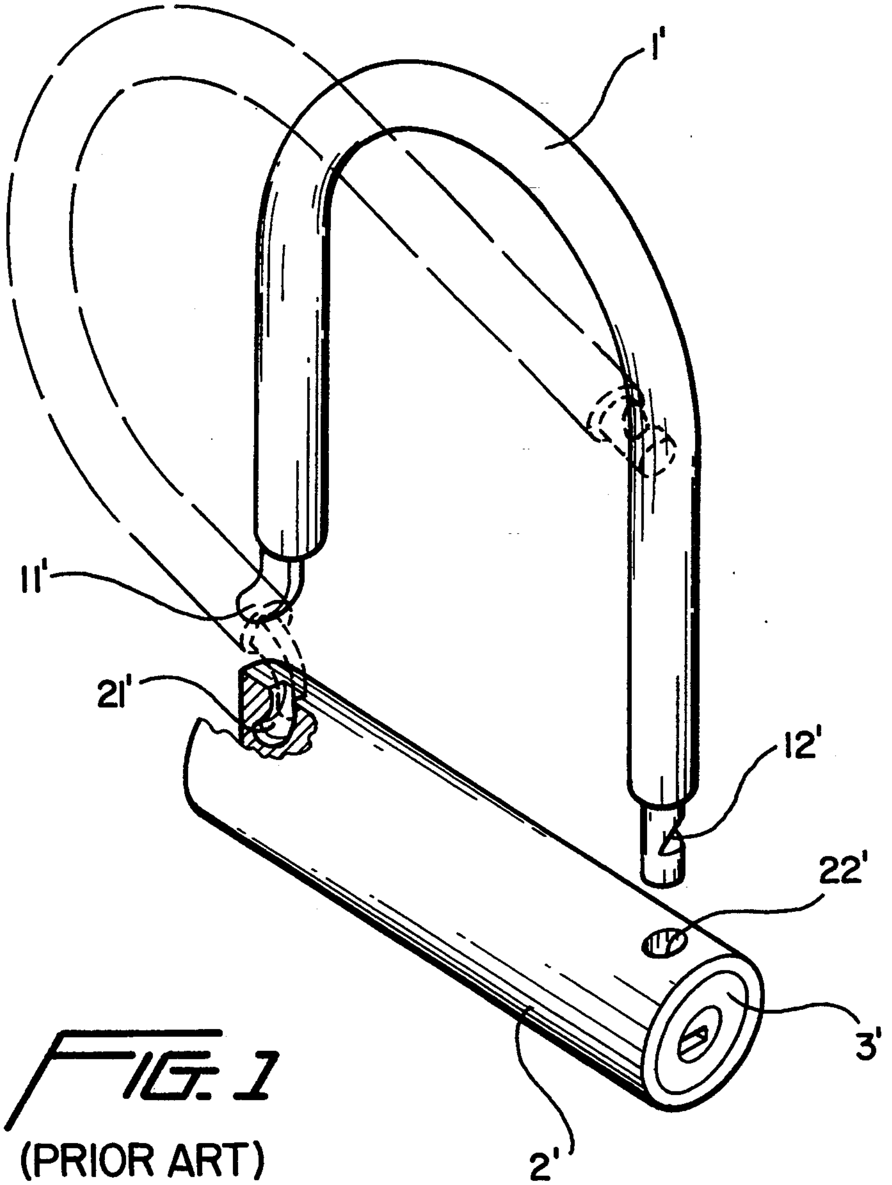
FIG. 1 (PRIOR ART)
FIG. 1 shows a prior art U-shaped padlock.
Figure 3:
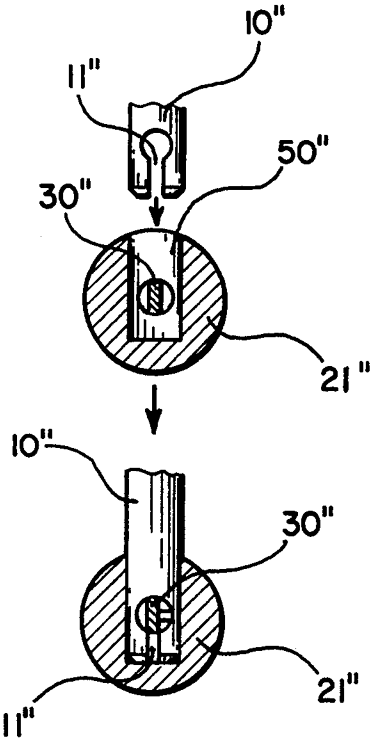
FIG. 3 (PRIOR ART)
FIG. 3 is a schematic view illustrating the operation of a prior art padlock.
Figure 2:
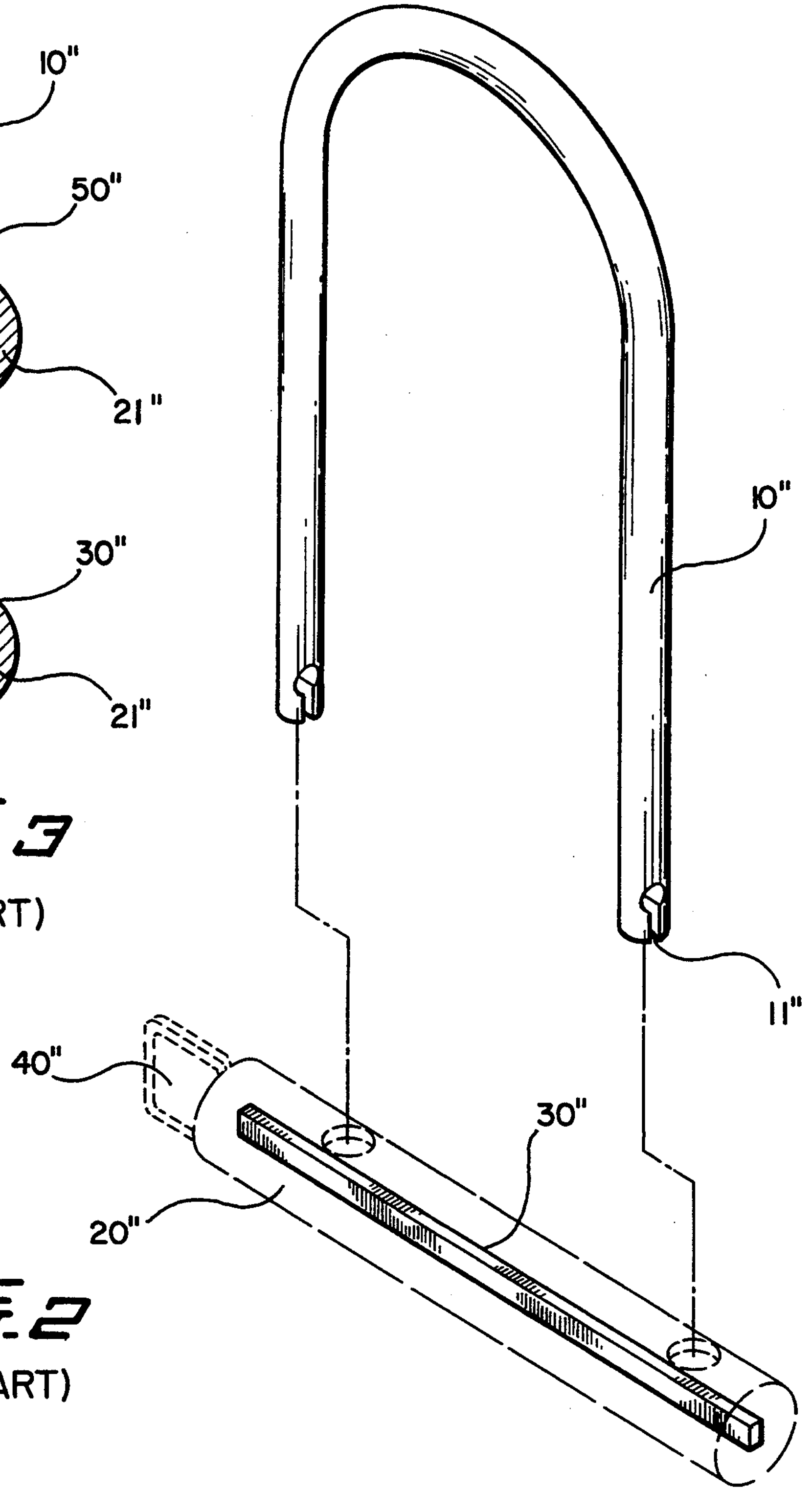
FIG. 2 (PRIOR ART)
FIG. 2 shows another prior art U-shaped padlock.
Figure 4:
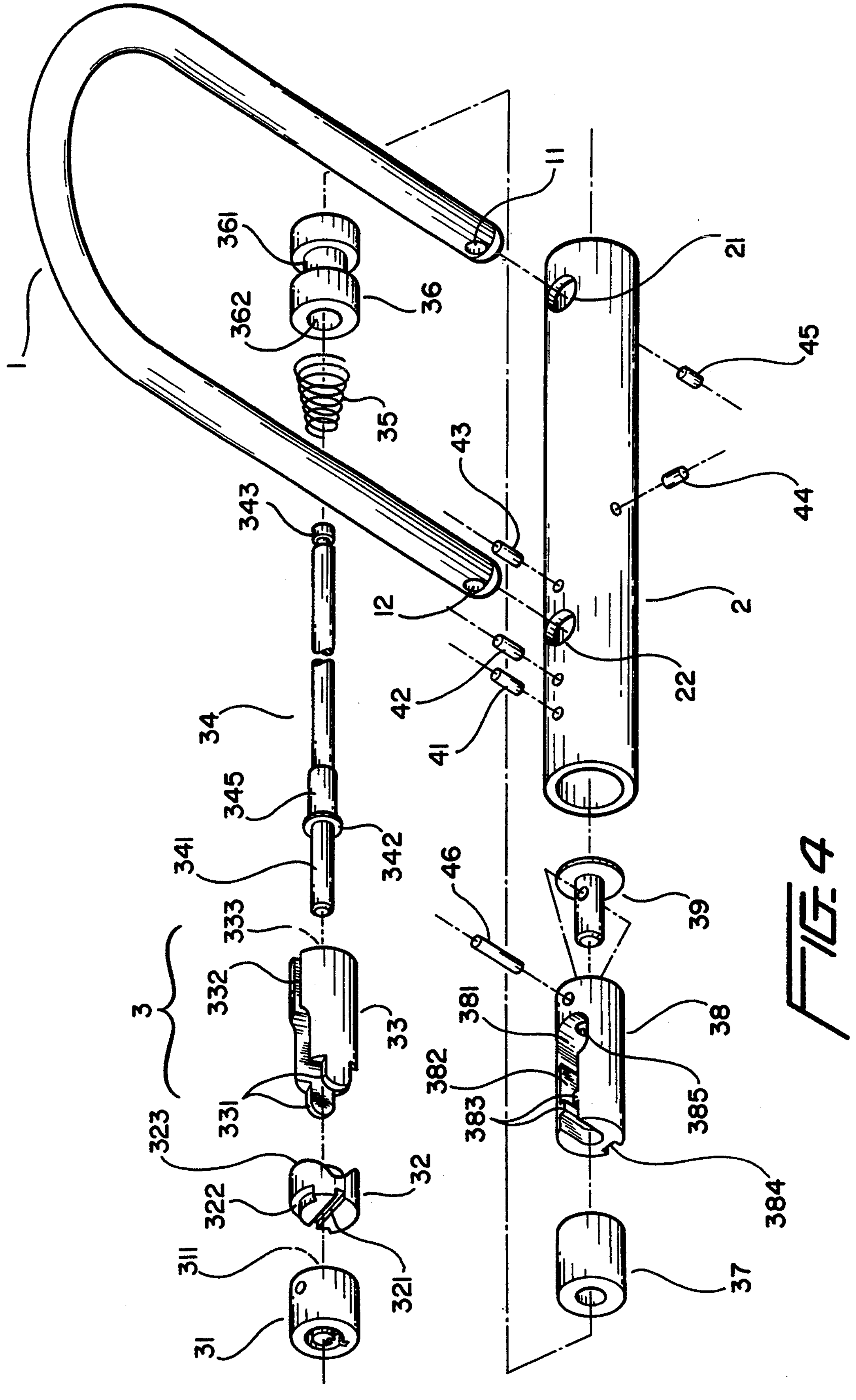
FIG. 4 is an exploded perspective view separately displaying the parts of a preferred embodiment of a U-shaped padlock structure according to the invention.

FIG. 4 shows the parts of a preferred embodiment of a U-shaped padlock structure according to the invention. The padlock structure is composed of a tubular lock body 2, a U-shaped shackle 1, and a transverse locking mechanism 3; the U-shaped shackle 1 having two semi-spherical end portions with through locking holes 11, 12 formed thereon; the tubular locking body 2 being a hollow cylinder on which are two insertion holes 21, 22 located at proper distances from two ends.

The transverse locking mechanism 3, which is enclosed in the tubular locking body, comprises in sequence a lock cylinder 31, a V-shaped cam 32, a front slide 33, a core rod 34, a resilient element 35, a locating element 36, a guide element 37, a rear slide 38, and a short core pin 39; the lock cylinder 31 being secured by a fixed pin 41 on the front end of the tubular locking body 2, the V-shaped cam 32 being engaged with a lock core 311 by way of a long slot 321 and provided with a rotation limiting groove 322 on the circumference thereof for confining the reciprocal rotation of the cam by a locating pin 42 within a preset range along the circumferential direction, the front slide 33 with two shoulder portions 331 resting against the cam surface 323 of the V-shaped cam having such a guide groove 332 that as the front slide moves along the longitudinal direction thereof, it moves within the constraints of a locating pin 43, and is prevented from rotation, the core rod 34 having provided on the front end thereof a core pin 341 inserted into the axle hole 333 of the front slide, on the middle segment an annular collar portion 342 leaning against the resilient element 35 and the locating element 36 followed by the center element 37, the locating element 36 with a longitudinal H-shaped cross sectional profile having provided on the middle segment thereof an annular recessed portions 361 such that the locating element is held within the tubular lock body 2 by a locating pin 44, the rear slide 38 being provided with an elliptical hole 381 and moving together with the core rod by way of engaging the raised blocks 383 in a groove 382 abutting on the elliptical hole with an annular groove 343 at the rear end of the core rod, the rear slide being further provided with a long guide groove 384 on the downside thereof through which guide groove the rear slide moves within the constraints of a locating pin 45 so that the movement of the rear slide is confined in the longitudinal direction, the short core pin 39 being secured in the axle hole 385 of the rear slide by a fixed pin 46.

Figure 5:
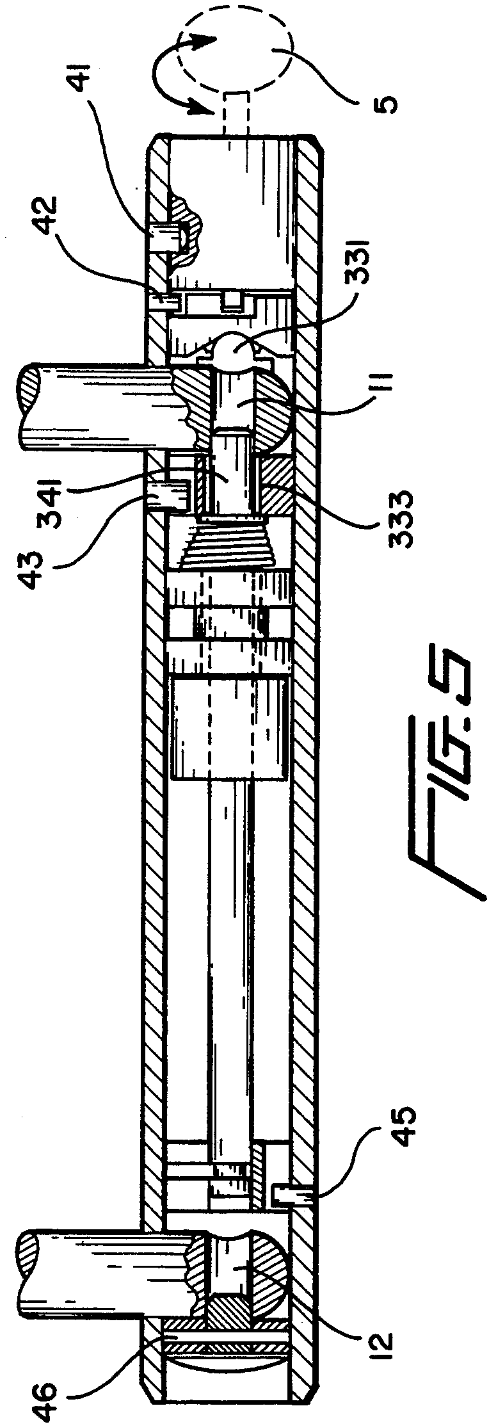
FIG. 5 is a front cross section view showing the embodiment of a U-shaped padlock in a locked state.
Figure 6:
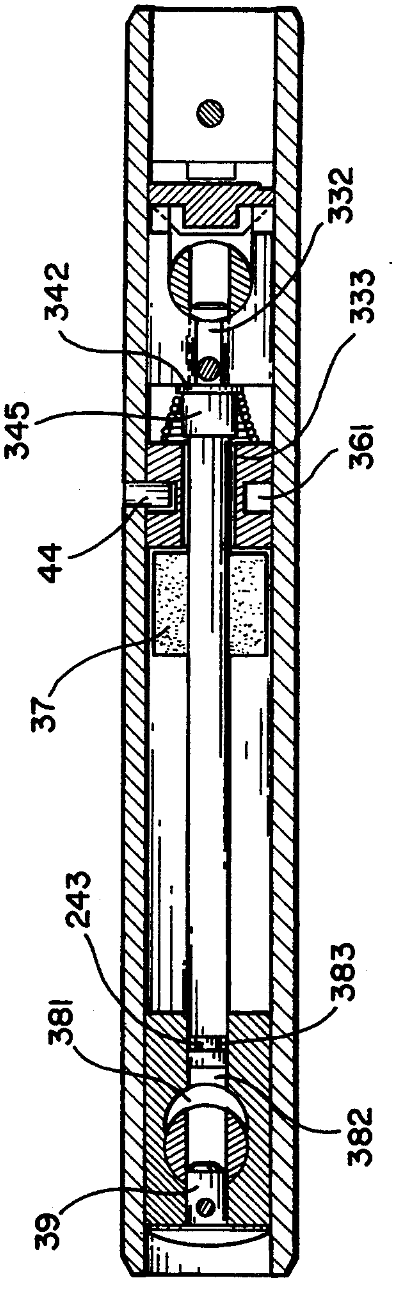
FIG. 6 is a top cross section view of the locked padlock shown in FIG. 5.
Figure 7:
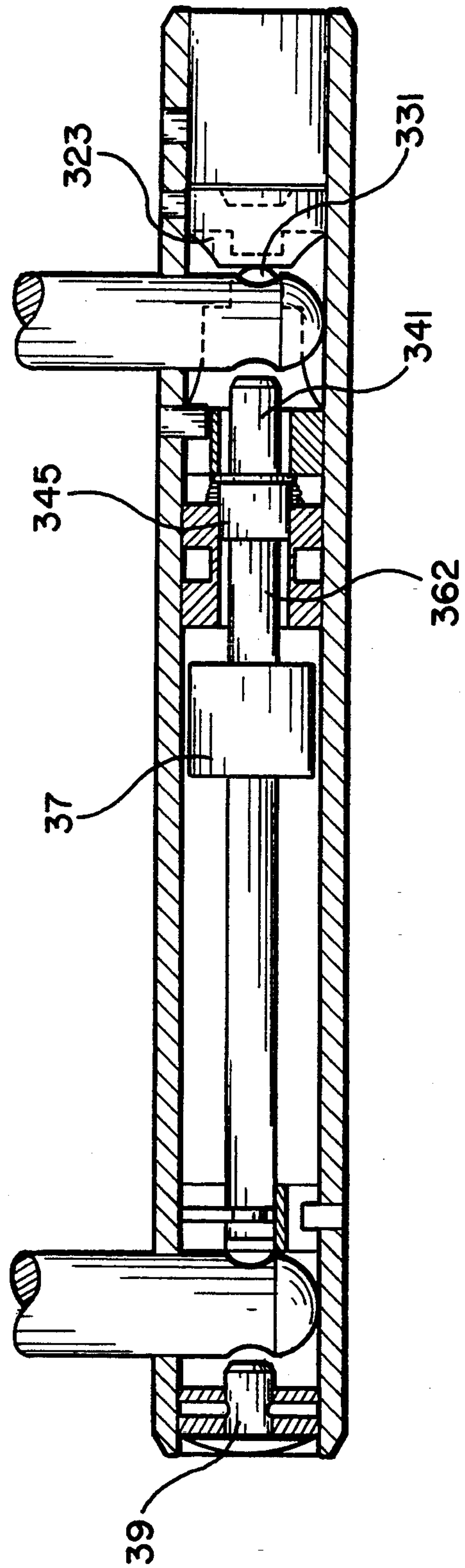
FIG. 7 is a front cross section view showing the U-shaped padlock of FIG. 5, with the core rod in an unlocked position.

Referring now to FIGS. 5, 6 and 7 on the basis of the structure described above, to lock the padlock, at first insert the two end portions of the U-shaped shackle 1 into the insertion holes 21, 22 of the tubular lock body and then rotate the lock cylinder 31 with a key 5 to turn the V-shaped cam 32 about 90 degrees, which makes two shoulder portions 331 of the front slide 33 fall into the recessed area on the cam surface 323, thus the front slide 33, the core rod 34, and the rear slide 38 being moved by the biasing force of the resilient element 35 to the right. As a consequence, the core pin 341 on the front end of the core rod and the short core pin 39 enter the locking holes 11, 12 respectively, resulting in a locking effect. To open the padlock, reversedly turn the lock cylinder 31 for 90 degrees with the key 5, by which the two shoulder portions 331 of the front slide 33 climb on the raised cam surface 323, thus compelling the front slide 33, the core rod 34, and the rear slide 38 moving backwards. At the same time, the core pin 341 on the front end of the core rod and the short core pin 39 are freed from the locking holes 11, 12, ending in an unlocked padlock.

Furthermore, it is worthwhile to mention a special anti-strike design incorporated in the padlock structure according to the invention. In the anti-strike design, the axle hole 333 of the front slide is contoured to be an elliptical one and a stepped round column 345 having a larger diameter that closely slidably fit the axle hole 362 of the locating element is provided on the middle segment of the core rod.

As the transverse locking mechanism 3 experiences external giant impact, the core rod 34 tends to move in a longitudinal direction, escaping from the locked position, due to a reaction to the impact. However, small elastic deformation in the elliptical axle hole 333 of the front slide and the core rod 34 arising from external forces makes the stepped round column 345 shift from a position exactly pointing to the axle hole 362 of the locating element, as a consequence of which the backward movement of the core rod 34 is inhibited. Therefore, giant impact or consecutive strikes can not open the locking device. The invention has the advantage of providing users with more security protection.

Additionally, corresponding to the foregoing anti-strike design, a center element 37 made of an elastically deformable material mounts on the middle segment of the core rod 34. The center element 37 is so designed that it is closely slidably fitted in the lock body 2 to position the core rod 34 on the center line under normal conditions, preventing the locking device from malfunctioning resulting from the core rod 34 deviating from the center line due to a worn axle hole 333 of the front slide.

What is claimed is:

1. A U-shaped padlock structure comprising:

a U-shaped shackle 1 having two semi-spherical end portions provided with through locking holes (11, 12);

a tubular lock body (2) being a hollow cylinder having two insertion holes (21, 22) individually located at proper distances from two ends thereof for receiving said shackle; and a transverse locking mechanism (3) inside said tubular lock body, said transverse locking mechanism in sequence consisting of:

a lock cylinder (31) secured at the front end of said tubular lock body (2) by a fixed pin (41);

a V-shaped cam (32) engaged with a lock core (311) by way of a long slot (321) and provided with a rotation limiting groove (322) on the circumference thereof for confining the reciprocal rotation of the cam by a locating pin (42) within a predetermined range along the circumferential direction;

a front slide (33) with two shoulder portions (331) resting against the cam surface (323) of said V-shaped cam, said front slide (33) having such a guide groove (332) that as the front slide moves along the longitudinal direction thereof, it moves within the constraints of a locating pin (43), and is prevented from rotation;

a core rod (34) having provided on the front end thereof a core pin (341) inserted into the axle hole (333) of said front slide, on the middle segment an annular collar portion (342) and a round stepped column (345) with a larger diameter, and on the rear end an annular groove (343);

a resilient element (35);

a locating element (36) with a longitudinal H-shaped cross sectional profile having provided on the middle segment thereof an annular recessed, portion (361) such that said locating element is held within the tubular lock body 2 by a locating pin (44);

a center element (37) mounting on the middle segment of said core pin (34);

a rear slide (38) provided with an elliptical hole (381) and moving together with the core rod by way of engaging a plurality of raised blocks (383) in a groove (382) abutting on said elliptical hole with the annular groove (343) at the rear end of the core rod, said rear slide further provided with a long guide groove (384) on a downside thereof; said rear slide moves within the constraints of a locating pin (45) in the guide groove so that the movement of said rear slide is confined in a longitudinal direction; and a short core pin (39) secured in an axle hole (385) of the rear slide by a fixed pin (46).

2. A U-shaped padlock structure as claimed in claim 1, in which the axle hole (333) of said front slide is contoured to be an elliptical one and on the middle segment of the core rod is provided a stepped round column (345) having a larger diameter that is closely slidably fitted in an axle hole (362) of the locating element to prevent the locking device from being unlocked by giant impact or consecutive strikes.

3. A U-shaped padlock structure as claimed in claim 1, wherein the center element (37) is elastically deformable and is closely slidably fitted in the tubular lock body (2) on the middle segment of the core rod (34) to position the core rod (34) on the center line under normal conditions.

* * * * *